(12) United States Patent
Wilson

(10) Patent No.: US 12,515,486 B2
(45) Date of Patent: *Jan. 6, 2026

(54) STATIONARY HITCH

(71) Applicant: Lyndi D. Wilson, Mesquite, NV (US)

(72) Inventor: Lyndi D. Wilson, Mesquite, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,223

(22) Filed: May 9, 2023

(65) Prior Publication Data

US 2023/0347697 A1  Nov. 2, 2023

Related U.S. Application Data

(63) Continuation of application No. 16/379,335, filed on Apr. 9, 2019, now Pat. No. 11,642,926.

(51) Int. Cl.
*B60D 1/66* (2006.01)
*B60D 1/60* (2006.01)

(52) U.S. Cl.
CPC ............... *B60D 1/66* (2013.01); *B60D 1/60* (2013.01)

(58) Field of Classification Search
CPC .................................. B60D 1/66; B60D 1/60
See application file for complete search history.

(56) References Cited

U.S. PATENT DOCUMENTS

| | | | | |
|---|---|---|---|---|
| 4,648,617 A | * | 3/1987 | Hannappel | B62K 5/06 280/475 |
| 7,621,554 B1 | * | 11/2009 | Cremer | B60D 1/075 280/476.1 |
| 9,333,822 B1 | * | 5/2016 | LaFave | B60R 9/06 |
| 9,908,378 B1 | | 3/2018 | Helms | |
| 10,252,591 B1 | * | 4/2019 | Searer | B66F 3/08 |
| 10,857,846 B1 | * | 12/2020 | Jacobs | B60D 1/06 |
| 11,014,591 B2 | * | 5/2021 | Parrish | B60D 1/06 |
| 2009/0322060 A1 | | 12/2009 | Macdougall | |
| 2016/0229244 A1 | * | 8/2016 | Drake | B60D 1/66 |
| 2018/0056947 A1 | | 3/2018 | Zimmerman | |
| 2020/0039478 A1 | * | 2/2020 | Moreno | B60S 9/22 |
| 2020/0262258 A1 | * | 8/2020 | Townsend, IV | B60D 1/06 |

* cited by examiner

*Primary Examiner* — Derek J Battisti
(74) *Attorney, Agent, or Firm* — David R. Conklin; Kirton McConkie

(57) ABSTRACT

A stationary hitch having a flat base for installation on a flat garage floor surface, or other surface, and includes a vertical pole extending therefrom that has spaced aligned holes formed to receive pins for mounting a slide at a selected height that includes a right angle arm extending from a forward face to provide a seat for maintaining a trailer ball connector that receives a trailer tongue cup connector for mounting the trailer, at a selected height, to maintain the trailer bed in a rigid flat attitude such that, when the trailer tail gate top edge is lowered to the floor, the trailer tail gate forms a stable ramp that an ATV, or the like, can be safely moved up and onto the trailer bed.

18 Claims, 5 Drawing Sheets

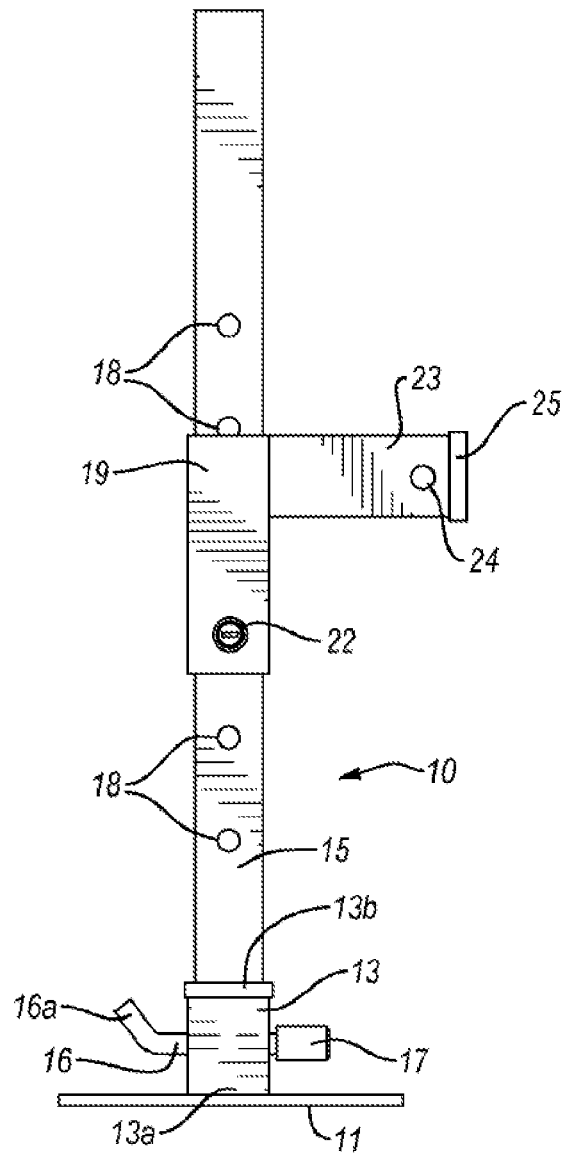
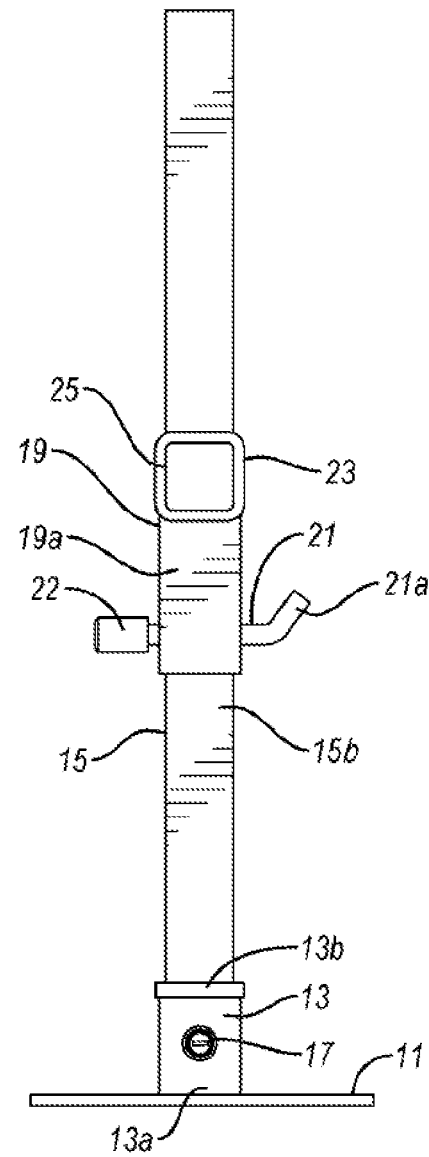
FIG. 3                    FIG. 4

STATIONARY HITCH

This application is a continuation of U.S. patent application Ser. No. 16/379,335 filed Apr. 9, 2019 and entitled STATIONARY HITCH, which is incorporated herein in its entirety.

BACKGROUND OF THE INVENTION

Field of the Invention

The invention is in a stationary hitch with an arrangement for installing it in a garage, trailer parking area, or the like, for rigidly supporting a trailer tongue, such as an ATV trailer, to safely allow an ATV to be moved off and onto the trailer.

Prior Art

Heretofore it has been generally necessary to maintain an ATV type trailers' tongue connected to a towing vehicle while loading or unloading an ATV onto the trailer bed. Such has required moving a trailer out of a storage area, such as a garage, to load and unload an ATV, making it impossible to load and unload such ATV onto the trailer that is parked in a garage as the trailer tongue would face out of the garage and the trailer tail gate would face the closed garage end. Previously, to provide a capability for loading and unloading an ATV from a trailer located in a garage, a movable stand or platform has been employed that may remain in position during a movement of the ATV on to or off of the trailer bed, causing the trailer gate end to fall to the ground and the tail tongue to lift, potentially causing the moving ATV to be damaged and or an operator thereof injured.

The, invention, to provide a stable hitch, includes a square tube post having a flat base for mounting, as with bolts, to a flat surface such that the post extends vertically, and includes aligned holes formed at spaced intervals that are to receive fasteners, such as pins or bolts, that lock through aligned holes formed through a square tube sleeve that is arranged to travel up and down the post, and which plurality of spaced holes provides for a selection of a proper height of the sleeve along the post to accommodate different trailer heights so as to maintain the trailer tongue at a desire height and essentially parallel to the ground. Which sleeve includes a right angle tubular arm that mounts a ball connector on its end that is a seat for a trailer tongue end coupling ball.

An earlier U.S. Pat. No. 9,908,378 to Helms shows an anti-theft locking post for maintaining a specific height of trailer to a post that is permanently mounted in concrete and connects to an auger that is an anchor that is turned into the ground before concrete is poured thereover, and does not provide for varying a height of a receiver there of to allow for connection to different trailer heights.

SUMMARY OF THE INVENTION

A principal object of the present invention is to provide a stationary hitch for a flat bed trailer, or the like, for installation, as by bolting a flat plate foot thereof, onto a flat floor, such as a garage floor, and mounts a pole, preferably a straight square tube fixed at a right angle to the flat plate, that includes aligned space apart holes formed therethrough, and which pole receives a sleeve, that is preferably a straight square tube, and is to travel along the pole, and includes aligned holes formed through the sleeve for alignment with the pole aligned holes to receive a fastener, and which sleeve has a right angle tubular arm fixed thereto that has an open end for receiving a trailer ball mount to attach to a trailer coupling ball.

Another object of the present invention is to provide locks for installation onto the respective fasteners for, when installed, prohibiting removal of the fastener and separating the stationary hitch components or removing the trailer end ball mount.

Principal features of the invention include a post mounted to extend vertically from a flat plate foot that is for mounting onto a flat surface, such as a garage floor, where the post is formed from a straight square tube and has spaced holes formed through opposing sides of the square tube that align to receive a fastener, such as a pin, fitted therethrough and through aligned holes formed through a sleeve, preferably a straight square tube, that is arranged to slide up and down the post, and which sleeve includes an arm, secured, on one end, to the side of the sleeve to extend at a right angle therefrom and is open at its other end to receive a trailer ball mount therein that includes a trailer coupling ball.

Another feature of the invention is in hitch lock pins for fitting over end of the post and sleeve fasteners, locking them in place until released, securing the trailer to the stationary hitch against theft of the trailer.

Another feature of the invention is in pins for fitting through aligned holes formed in the arm and trailer end coupling ball for maintaining them in place, and which pins each include a lock for maintaining the arm and trailer end coupling together until released.

Still another feature of the invention is the inclusion of a lock with a trailer tongue end coupling cup for locking to the trailer end coupling ball until released.

DESCRIPTION OF THE DRAWINGS

In the drawings that illustrate that which is presently regarded as the best mode for carrying out the invention:

FIG. 3 is a side elevation view of the stationary hitch of FIG. 2;

FIG. 4 is an end elevation view of the stationary hitch of FIG. 3 looking into the end of the slide arm;

DETAILED DESCRIPTION

Figure 1:
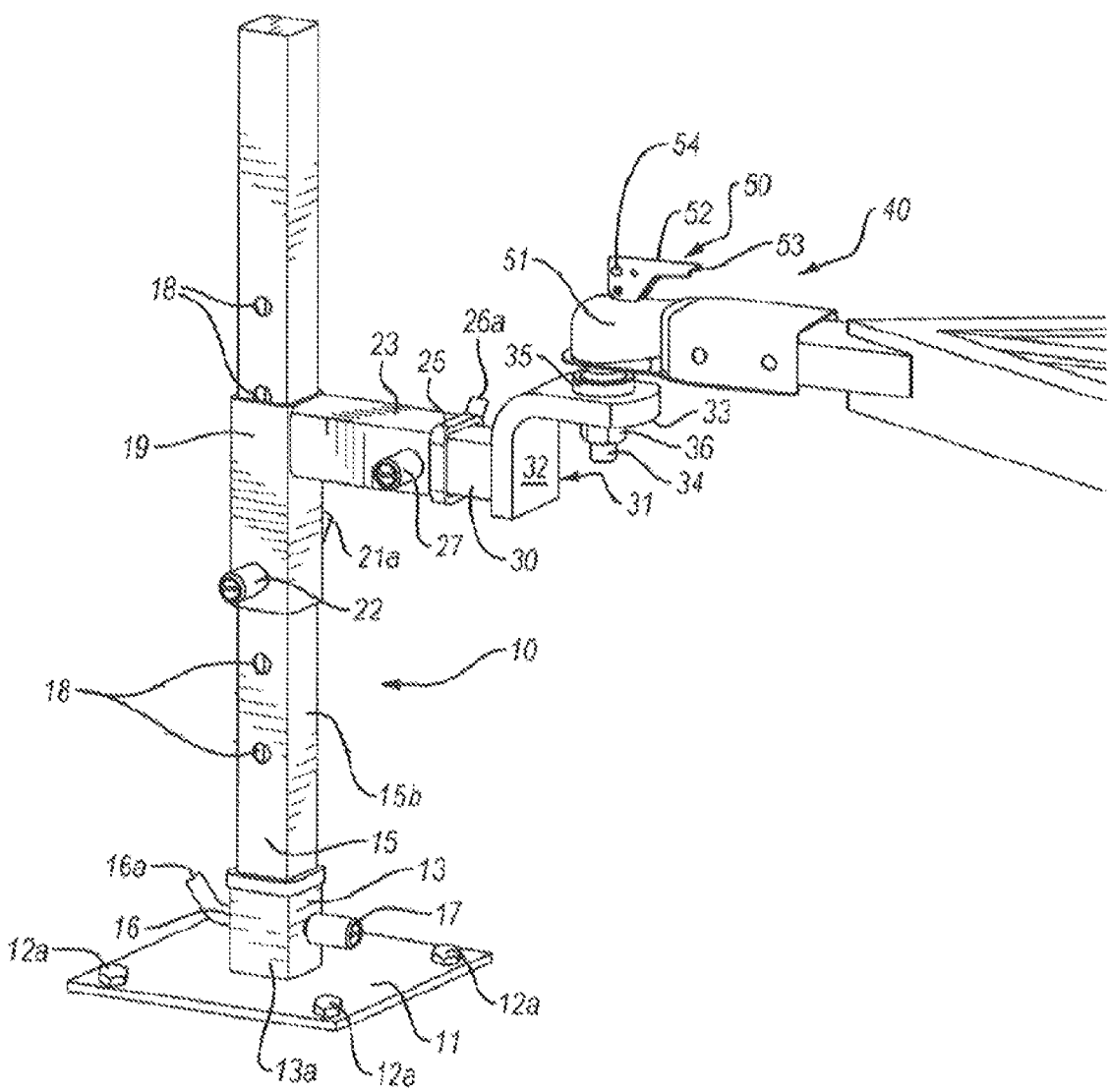
FIG. 1 is a side elevation perspective view of the invention in a stationary hitch that is shown with a trailer tongue end coupling cup fitted onto a ball connector of a slide arm.
Figure 2:
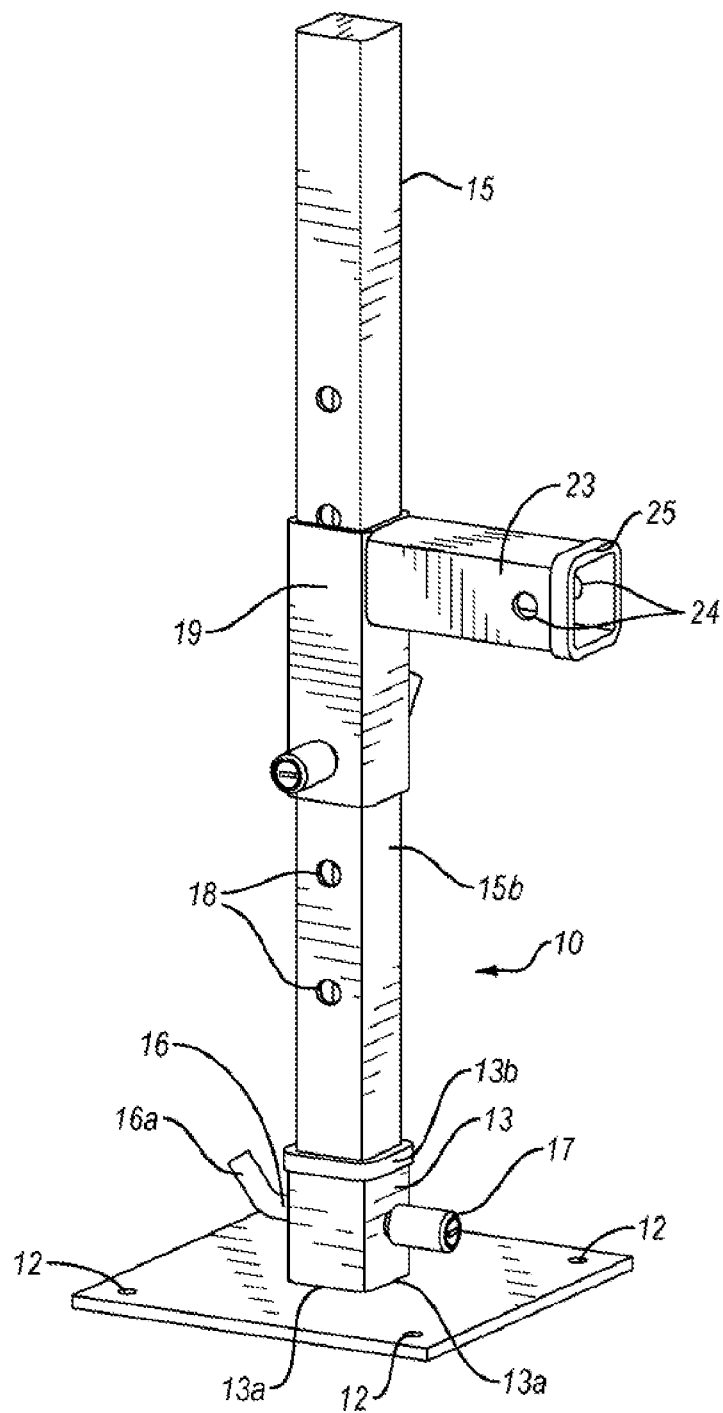
FIG. 2 is an enlarged side elevation perspective view of the stationary hitch of FIG. 1 less the ball connector.
Figure 5:
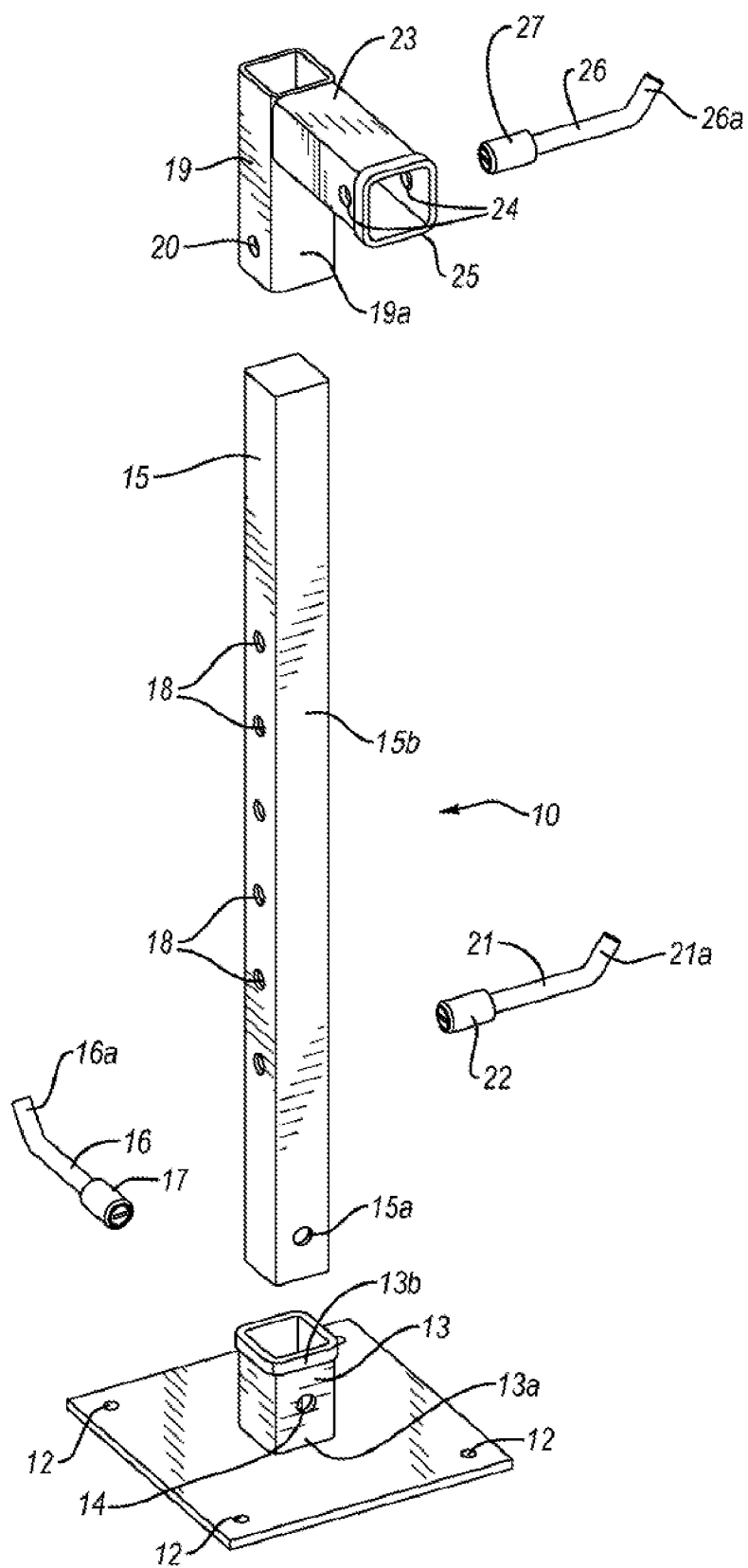
FIG. 5 is an exploded view of the stationary hitch of FIG. 2 looking into the end of the slide arm.

FIGS. 1 through 5 show the components of a stationary hitch 10 of the invention as including a flat square bottom plate 11 having corner holes 12 formed therethrough, as shown in FIGS. 2 and 5 that are to receive bolts 12, or screws, as shown in FIG. 2, fitted therethrough and turned into a flat surface, such a garage floor. A collar 13 is shown in FIGS. 1 through 5 as a sleeve that has its lower edge 13a permanently secured to the center of the top of the square bottom plate 11, and includes an open top end 13b. The collar 13 includes a pair of aligned holes 14 formed through opposite sides thereof and the open collar 13 top end is to receive a straight post 15 fitted therein. Which straight post 15 is locked in the collar 13 by an operator, not shown, holding a bent end 16a of a pin 16 in their hand and fitting it through align collar holes 14 and aligned post holes 15a, as shown in FIG. 5, and which pin 16 can be locked in position by an installation of a lock 17 onto a pin end opposite to the pin bent end 16a.

FIGS. 1 through 5 also show a slide 19 fitted to travel up and down the pole 15 that includes a pair of aligned holes 20, shown in FIG. 5, that are for alignment with the pairs of holes 18 formed in the pole 15 to receive a pin 21 installed by an operator, not shown holding a bent end 21a of pin 21 and fitting it through the aligned pairs of holes 18 and 20. Whereafter, to maintain the slide 19 positioning, a lock 22 is preferably fitted over the pin 21 end opposite to bent end 21a. Which slide, as shown in FIGS. 1 through 5, includes an arm 23 mounted to extend at a right angle to the slide forward side 19a that is open there along from its mounting to the slide 19 surface, and includes a pair of aligned holes 24 formed therethrough and includes an open outer end 25. Which aligned holes 24 are to receive a pin 26, shown in FIG. 5, that has a pin end 26a and is for fitting through holes 24 for mounting a ball connector 30 to the arm open end 25, as shown in FIG. 1, and which pin 26 other end can receive a lock 27 fitted thereto.

In practice, the sleeve 13, pole 15, slide 19 and arm 23 are all formed from rectangular tube stock, though, it should be understood, other appropriate shapes of tube stock, such as round pipes, could be used for the construction of the sleeve 13, pole 15, and slide 19, within the scope of this disclosure. Further, where bolts 12a are shown as preferred for mounting the bottom plate 11 onto a flat surface, such as a garage floor, other connectors, such as screws, could be so used within the scope of this disclosure. Also, while pins 16, 21 and 26 are shown as including bent ends 16a, 21a and 26a, other configurations of pins could be used as described within the scope of this disclosure. Additionally, the invention preferably includes pin end locks 17, 22 and 27, that are each shown as receiving a key fitted therein that, when turned, lock the lock onto pin end such as by moving a ball within the lock, not shown, into a slot, not shown, formed around the pin end opposite to the pin bent end for prohibiting withdrawal of the pin until unlocked. It should, however, be understood that such arrangements of locks can be varied within the scope of this invention.

In practice, the stationary hitch 10 is mounted onto a garage floor, near a rear wall thereof, such that a forward face 15b of the post 15 faces outwardly, as shown in FIGS. 1, 2, 4 and 5 towards the garage door. In practice, a positioning of the slide 19 along the post 15 is selected to position the trailer at a proper height of the trailer bed such that the trailer tail gate top edge, not shown, can be lowered to the ground at a proper angle to function as a ramp for driving or manually loading an ATV, or other vehicle, onto the trailer bed for storage. Whereafter, the trailer, illustrated as including a trailer tongue 40 in FIG. 1, is manually pulled into the garage with the trailer rolling on its tires, not shown, to where a trailer hitch 50 mounted to the trailer tongue 40 end, is moved to position an open cup end 51 of the trailer hitch 50 over a ball of the ball connector 30. Which ball connector, as shown in FIG. 1, includes a right angle bracket 31 having a first leg 32 connected to the ball connector 30 outer end and a second leg 33, that is at a right angle to the first leg 32, and has a hole formed therethrough that receives a threaded ball coupling shaft 34 that extends from a ball flat base 35 and has a nut 36 turned thereon to maintain the ball mounted to the right angle bracket 31. To maintain the ball of the ball connector 30 to the trailer hitch 50, the trailer hitch includes a locking arm 52 that is pivot mounted onto top of the open cup end 51 that, when the arm 52 end 53 is lifted vertically, the cup can travel over the ball of the ball connector. Whereafter, the arm end 53 is lowered to the attitude shown in FIG. 1, maintaining the cup and ball together until the arm end 53 is lifted. Additionally, the arm 52 includes a hole 54 formed therethrough that is to receive a pin, pad lock, or the like, fitted therethrough that prohibits lifting the arm end 53 until released. The described ball connector 30 and trailer hitch 50 are standard vehicle and trailer towing arrangements.

Figure 6:
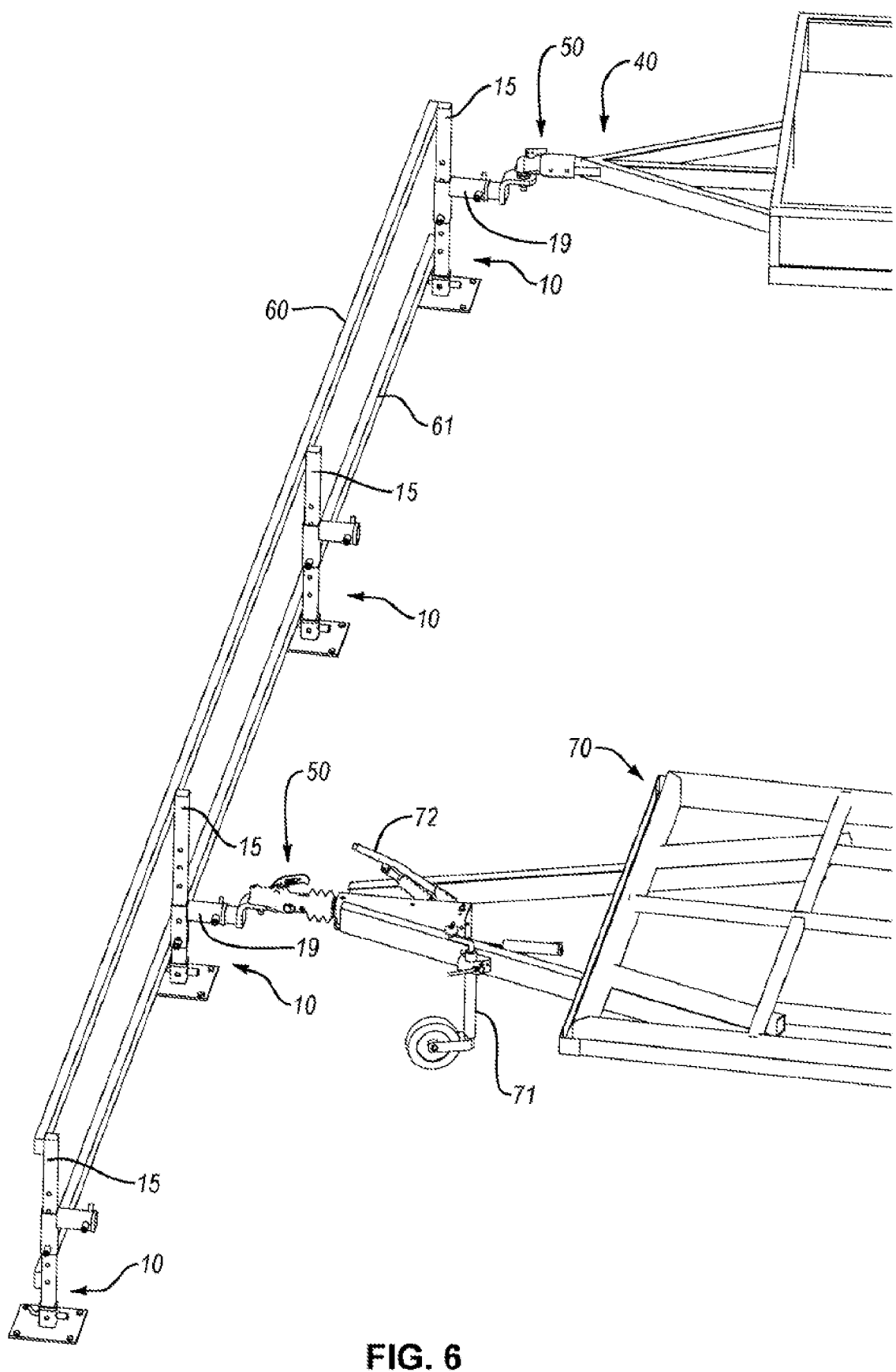
FIG. 6 is a top plan perspective view of a trailer parking area showing four stationary hitches of the invention mounted in a row to function as trailer hitches and are spaced apart with vertical posts shown as also functioning as fence posts that mount top and mid-section rails, and showing two different trailers mounted to ball couplings that have been fitted to stationary hitch slide arms.

FIG. 6 is here included as showing an alternative use of the stationary hitch 10 where stationary hitches 10 are mounted to a flat surface at spaced intervals, such as a trailer parking area, where trailers are stored while ATV, or like vehicles, owners are operating their vehicles off-road, or on trails, and where the parking area is maintained by a town, park or the like. Shown in FIG. 6, the vertical posts can also serve as fence posts for top rail 60 and center rail 61, and shows a trailer, like that shown in FIG. 1, as having tongue 40, and a trailer 70 that is shown as having a landing gear 71 that is raised and lowered by operation of a lever arm 72. Both trailers are shown as having like trailer hitches, 50 with trailer 70 shown as being a flat bed and the other as having low side rails, and illustrate that the stationary hitch 10 can be used with a variety of trailers by an adjustment of the height of the slide 19 along the post 15 to level the trailer hitch arm 23 to the height of the particular trailer bed. Additionally, while not shown, the stationary hitch 10 can be maintained in trailer storage areas, in a mechanic repair shop yard, a side yard of a home, or the like, for providing the safe and secure storage of a trailer.

Herein above has been shown and described a preferred embodiment of the stationary hitch of the invention. It should, however, be understood that the present disclosure is made by way of example only and that variations are possible without departing from the subject matter coming within the scope of the following claims, and a reasonable equivalency thereof, which subject matter I regard as my invention.

I claim:

1. A stationary hitch comprising:
   a base plate having a top face, a bottom face, and a passage formed therethrough, the passage being configured to receive an anchor for securing the base plate to a stationary surface;
   a pole having a fixed length and comprising:
      a bottom end configured to be selectively coupled to the top face of the base plate; and
      a top end opposite the bottom end and located at a fixed height above the base plate when the bottom end of the pole is coupled to the top face of the base plate, wherein the top end of the pole comprises a substantially planar and solid surface; and a slide comprising:
      a sleeve coupled to an exterior of the pole, the sleeve being configured to travel along the fixed length between the top end and the bottom end of the pole without changing the fixed height of the top end of the pole, the sleeve comprising:

an open top end and an open bottom end such that an entirety of the sleeve is configured to be selectively disposed between the bottom end and the top end of the pole; and a front face; and an arm having a first end and a second end, the first end being fixedly coupled to the front face of the sleeve so as not to obscure the open top end of the sleeve, the second end of the arm being positioned opposite the first end of the arm, and the arm extending outwardly away from the front face of the sleeve, the second end comprising an opening for receiving a ball connector mount.

2. The stationary hitch of claim 1, wherein the arm is coupled to a top third of the sleeve.

3. The stationary hitch of claim 2, wherein a top face of the arm is substantially aligned with a top edge of the front face of the sleeve.

4. The stationary hitch of claim 3, wherein the sleeve comprises a bottom opening and a top opening, and wherein both the bottom opening and the top opening are configured to selectively slide onto the pole such that the sleeve is configured to travel along the fixed length of the pole in each of a right-side-up orientation and an upside-down orientation.

5. The stationary hitch of claim 4, wherein the pole further comprises a height-adjustment hole, and the slide comprises a corresponding hole disposed perpendicular to the arm, wherein when the corresponding hole is aligned with the height-adjustment hole, the corresponding hole is configured to receive a pin for coupling the slide to the pole.

6. The stationary hitch of claim 5 wherein the corresponding hole is formed in a bottom half of the sleeve, such that when the slide is in the upside-down orientation and the corresponding hole is aligned with the height-adjustment hole, the arm is at a substantially different height than when the slide is in the right-side-up orientation and the corresponding hole is aligned with the height-adjustment hole.

7. The stationary hitch of claim 1, wherein the arm is coupled to the sleeve at a right angle.

8. The stationary hitch of claim 1, wherein the pole further comprises a height-adjustment hole, and the slide comprises a corresponding hole that, when aligned with the height-adjustment hole, is configured to receive a pin for coupling the slide to the pole at a set height.

9. The stationary hitch of claim 1, wherein when the pole is coupled to the base plate, the pole extends away from the base plate substantially perpendicular to the top face of the base plate.

10. The stationary hitch of claim 1, further comprising a collar fixedly attached to the top face of the base plate and configured to receive the bottom end of the pole.

11. The stationary hitch of claim 10, wherein a height of the collar is less than a height of the sleeve.

12. The stationary hitch of claim 10, wherein the collar comprises a receiving hole and the bottom end of the pole comprises a reciprocal hole that, when aligned with the receiving hole, is configured to receive a locking pin for coupling the pole to the base plate.

13. The stationary hitch of claim 12, wherein the reciprocal hole is configured to align with the receiving hole when the bottom end of the pole is in contact with the top face of the base plate.

14. The stationary hitch of claim 1, wherein the top end of the pole is substantially square.

15. The stationary hitch of claim 1, wherein the passage is configured to receive a bolt.

16. The stationary hitch of claim 4, wherein when the sleeve is disposed at a particular height with respect to the pole, the arm is disposed at a first height when the sleeve is in the right-side-up orientation and a second height when the sleeve is in the upside-down orientation, wherein the first height is greater than the second height.

17. The stationary hitch of claim 16, wherein the opening of the arm is configured to receive the ball connector mount in an upwards orientation whether the sleeve is in the right-side-up orientation or the upside-down orientation.

18. A stationary hitch comprising:
a base plate having a top face, a bottom face, and a passage formed therethrough, the passage being configured to receive an anchor for securing the base plate to a stationary surface;
a pole having a fixed length and comprising:
a bottom end configured to be selectively coupled to the top face of the base plate; and
a top end opposite the bottom end and located at a fixed height above the base plate when the bottom end of the pole is coupled to the top face of the base plate; and a slide comprising:
a sleeve coupled to an exterior of the pole, the sleeve being configured to travel along the fixed length between the top end and the bottom end of the pole without changing the fixed height of the top end of the pole, the sleeve comprising:
an open top end and an open bottom end such that an entirety of the sleeve is configured to be selectively disposed between the bottom end and the top end of the pole; and
a front face; and
an arm having a first end and a second end, the first end being fixedly coupled to the front face of the sleeve so as not to obscure the open top end of the sleeve, the second end of the arm being positioned opposite the first end of the arm, and the arm extending outwardly away from the front face of the sleeve, the second end comprising an opening for receiving a ball connector mount,
wherein the arm is coupled to a top third of the sleeve, a top face of the arm is substantially aligned with a top edge of the front face of the sleeve, the sleeve comprises a bottom opening and a top opening, and wherein both the bottom opening and the top opening are configured to selectively slide onto the pole such that the sleeve is configured to travel along the fixed length of the pole in each of a right-side-up orientation and an upside-down orientation, when the sleeve is disposed at a particular height with respect to the pole, the arm is disposed at a first height when the sleeve is in the right-side-up orientation and a second height when the sleeve is in the upside-down orientation, and the first height is greater than the second height.

* * * * *